US008068123B2

(12) United States Patent
Ahn

(10) Patent No.: US 8,068,123 B2
(45) Date of Patent: Nov. 29, 2011

(54) DISPLAY AND DRIVING METHOD THEREOF

(75) Inventor: Ji Young Ahn, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 762 days.

(21) Appl. No.: 11/473,549

(22) Filed: Jun. 23, 2006

(65) Prior Publication Data

US 2007/0146394 A1 Jun. 28, 2007

(30) Foreign Application Priority Data

Dec. 27, 2005 (KR) ........................ 10-2005-0130739

(51) Int. Cl.
*G09G 5/10* (2006.01)
*G06F 3/038* (2006.01)

(52) U.S. Cl. ........................... 345/690; 345/204; 345/89

(58) Field of Classification Search .................... 345/30, 345/55, 84, 87, 89, 204, 690
See application file for complete search history.

(56) References Cited

U.S. PATENT DOCUMENTS

2002/0097252 A1* 7/2002 Hirohata ........................ 345/690
2004/0263462 A1* 12/2004 Igarashi ........................... 345/98
2005/0024353 A1* 2/2005 Amundson et al. ........... 345/204
2005/0062703 A1* 3/2005 Lee et al. ......................... 345/89
2005/0083435 A1* 4/2005 Itoh et al. ....................... 348/441

FOREIGN PATENT DOCUMENTS

JP 2002-323876 11/2002
JP 2003-022061 1/2003
JP 2004-309657 11/2004

OTHER PUBLICATIONS

Office Action issued in corresponding Japanese Patent Application No. 2006-179115; issued Dec. 16, 2009.

* cited by examiner

*Primary Examiner* — Lun-Yi Lao
*Assistant Examiner* — Jarurat Suteerawongsa
(74) *Attorney, Agent, or Firm* — Brinks Hofer Gilson & Lione

(57) ABSTRACT

A display device that includes a data modulator for comparing input data of m (m is a natural number of not less than 2) number of frames and inserts any one of black data and gray data in accordance with the comparison result and a driving method thereof are provided.

16 Claims, 14 Drawing Sheets

LCD

DISPLAY AND DRIVING METHOD THEREOF

This application claims the benefit of Korean Patent Application No. P2005-0130739 filed on Dec. 27, 2005 that is hereby incorporated by reference.

BACKGROUND

1. Field

A hold type display device and a driving method thereof are provided.

2. Related Art

In hold type display devices like a liquid crystal display (LCD) or organic light emitting diode (OLED), a motion blurring phenomenon is displayed on a screen. During this motion blurring phenomenon a screen is not clear but blurred in a motion picture by a maintenance characteristic. This maintenance characteristic will be explained in conjunction with FIGS. 1 to 4, which represent a data characteristic of a liquid crystal display device and a cathode ray tube (CRT).

The CRT, as shown in FIG. 1, is an impulse type display device that displays data by making a phosphorus emit light for a very short time in an early stage of one frame period and where most of the one frame period remains as a pause interval. Accordingly, in the CRT, a perceived image is displayed clearly, as shown in FIG. 2. The perceived image is of an image that an observer perceives.

In a liquid crystal display device, as shown in FIG. 3, data is supplied to a liquid crystal for a scanning period when a scan high voltage is supplied and the data supplied to the liquid crystal is maintained in a non-scanning period that takes most of one frame period. Accordingly, the display picture is blurred in the liquid crystal display device, as shown in FIG. 4, because of a motion blurring phenomenon. The perceived image results from an integration effect of the image which temporarily lasts in an eye that follows a movement. Accordingly, even though the response speed of the liquid crystal display device is fast, an observer sees a blurred screen because of discordance between the movement of the eye and the static image of each frame.

Conventionally, in order to decrease the motion blurring of the liquid crystal display device of the related art, the holding time is reduced and black data is inserted for a frame period.

The black data insertion (BDI) method reduces the holding time D1-D5 of frame data within each frame and inserts black data B1-B5, as in FIG. 6. This method is different from a normal method that inserts one frame data for each frame, as in FIG. 5. Thus, a liquid crystal display device is driven by a pseudo-impulse type to decrease the motion blurring phenomenon.

Because the holding time of each frame is reduced and the black data are inserted in the black data insertion method like this the brightness is remarkably decreased in the black data insertion method, as in FIG. 7.

SUMMARY

An advantage of the present invention is to provide a display device that is adaptive for solving a motion blurring problem and minimizing brightness deterioration in a hold type display device, and a driving method thereof.

A display device includes a data modulator that compares input data of m (m is a natural number of not less than2) number of frames and inserts any one of black data and gray data in accordance with the comparison result. The modulator modulates the input data. A driver supplies the input data modulated by the data modulator to a display panel.

A driving method of a display device includes comparing input data of m (m is a natural number of not less than 2) number of frames and inserting any one of black data and gray data in accordance with the comparison result, wherein the input data is modulated; and supplying the modulated input data to a display panel.

In another embodiment, a display device includes a data modulator that modulates video data by inserting any one of black data or gray data to at least one frame from the first frame among a plurality of frames in case that the plurality of frames having the same video data are continuously inputted; and a driver for supplying the video data modulated by the data modulator to a display panel.

DRAWINGS

These and other variations will be apparent from the following detailed description of the exemplary embodiments with reference to the accompanying drawings, in which.

Figure 13:
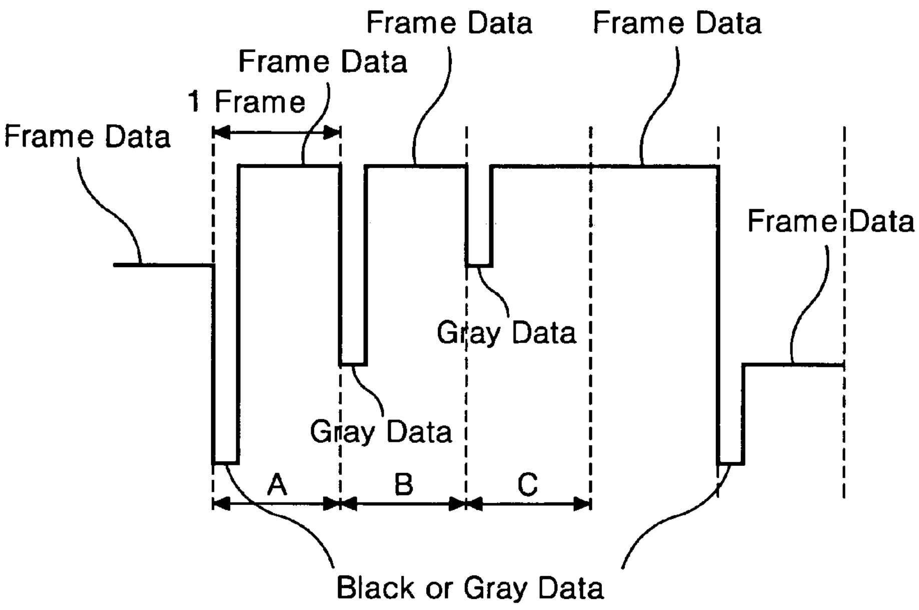
Figure 14:
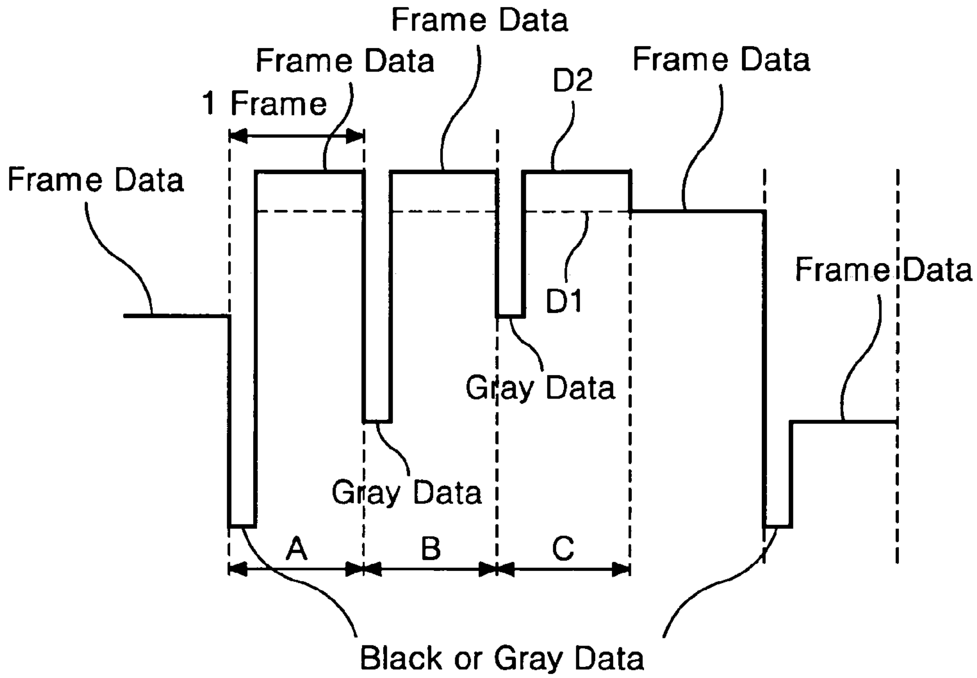

12 is a diagram representing the data that are modulated of another embodiment;

FIG. 13 is a diagram representing the data that are modulated of another embodiment of another embodiment; and FIG. 14 is a diagram representing an example where an over driving method is applied.

DESCRIPTION

The preferred embodiments will now be described in accordance with the drawings.

Figure 1:
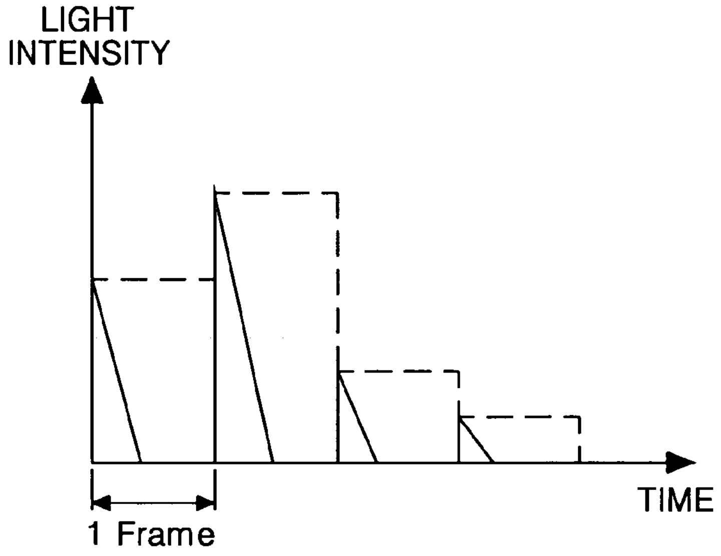
FIG.1 RELATED ART
FIG. 1 is a diagram representing a light emission characteristic of a cathode ray tube.
Figure 2:
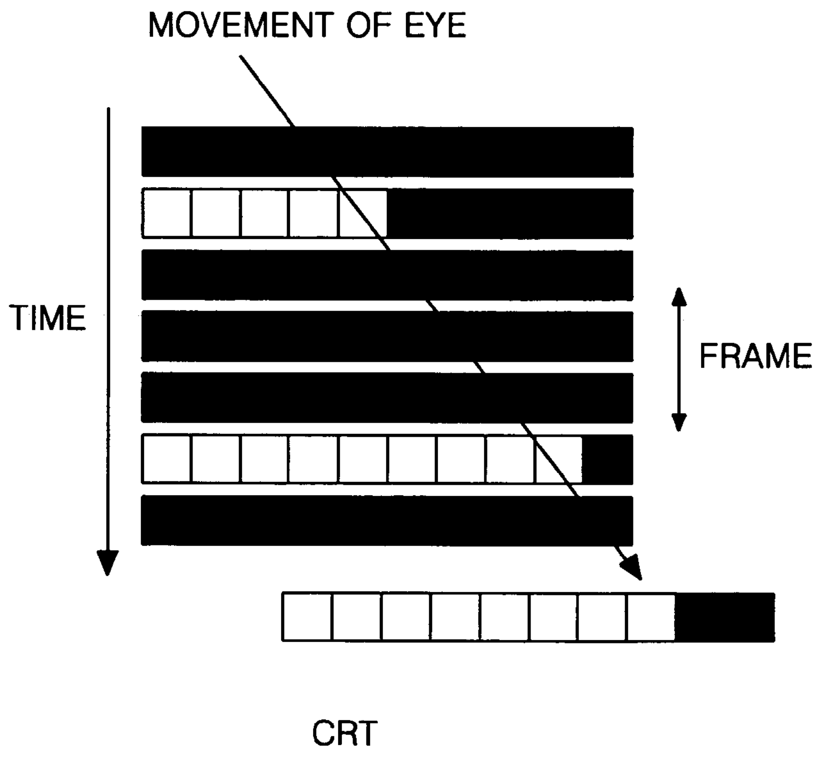
FIG.2 RELATED ART
FIG. 2 is a diagram representing a perceived image of a cathode ray tube that an observer perceives.
Figure 3:
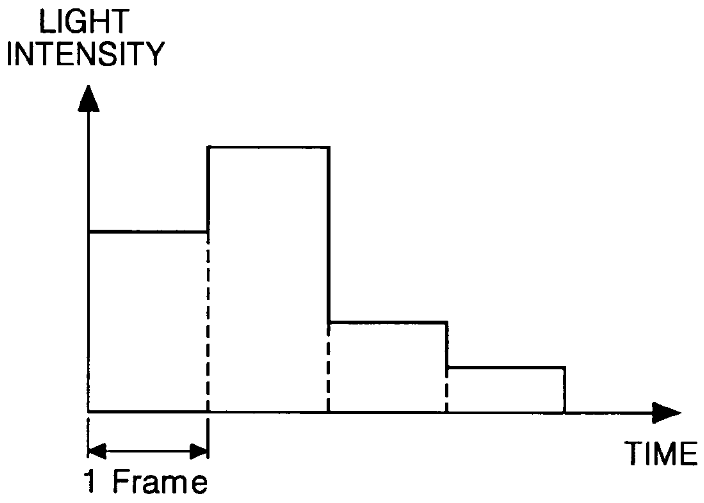
FIG.3 RELATED ART
FIG. 3 is a diagram representing a light emission characteristic of a liquid crystal display device.
Figure 4:
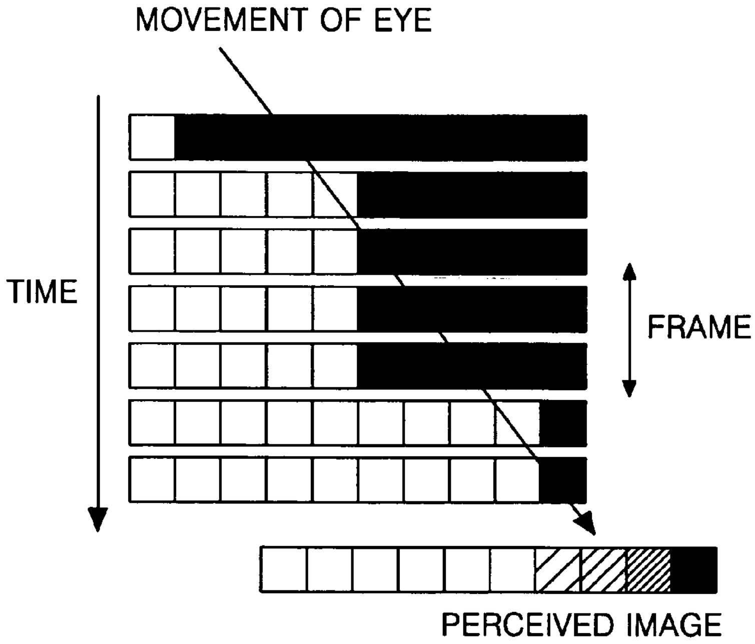
FIG. 4 RELATED ART
FIG. 4 is a diagram representing a perceived image of a liquid crystal display device that an observer perceives.
Figure 5:
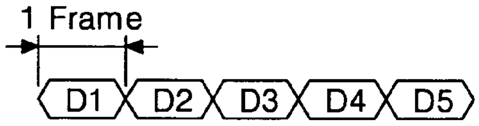
FIG.5 RELATED ART
FIG. 5 is a diagram representing a data arrangement of normal state.
Figure 6:
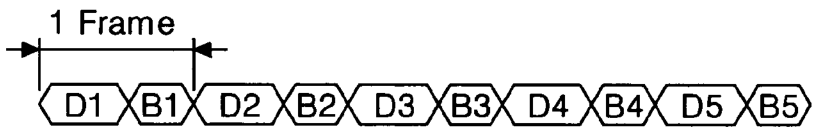
FIG.6 RELATED ART
FIG. 6 is a diagram representing a data arrangement where black data are inserted to the whole gray level area.
Figure 7:
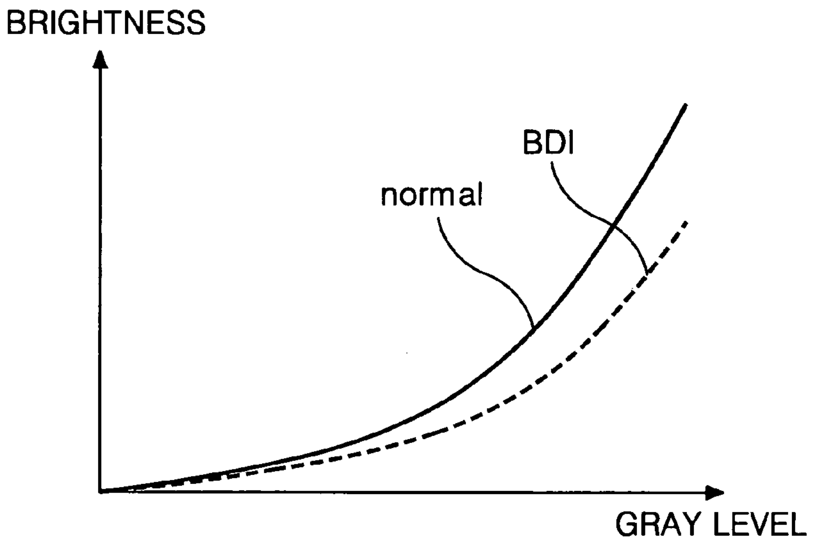
FIG.7 RELATED ART
FIG. 7 is a diagram comparing the brightness of normal state with the brightness upon the black data insertion.
Figure 8:
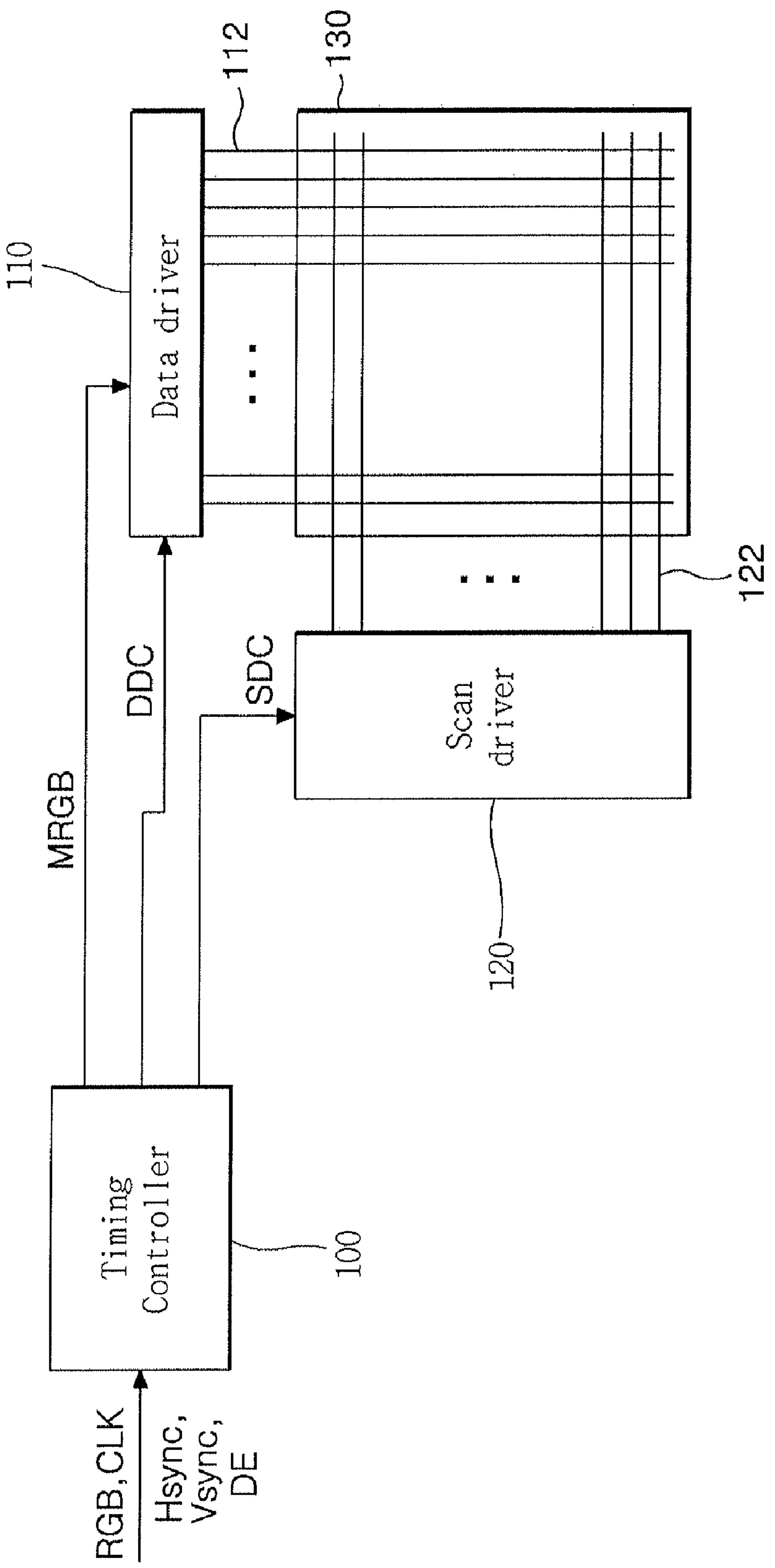
FIG. 8 is a block diagram briefly representing a display device.

As shown in FIG. 8, a display device includes a display panel 130 where data lines 112 cross scan lines 122 and a plurality of pixels are formed. A data driver 110 supplies a data signal to the data line 112 of the display panel 130. A scan driver 120 supplies a scan signal to the scan line 122 of the display panel 130. A timing controller 100 modulates input data and controls the data driver 110 and the scan driver 120 by use of the modulated data.

In the display panel 130, the data lines 112 and the scan lines 122 cross each other perpendicularly and the pixels are arranged in a matrix. The display panel 130 is a display panel of a hold type display device like an LCD panel or OLED panel.

Figure 9:
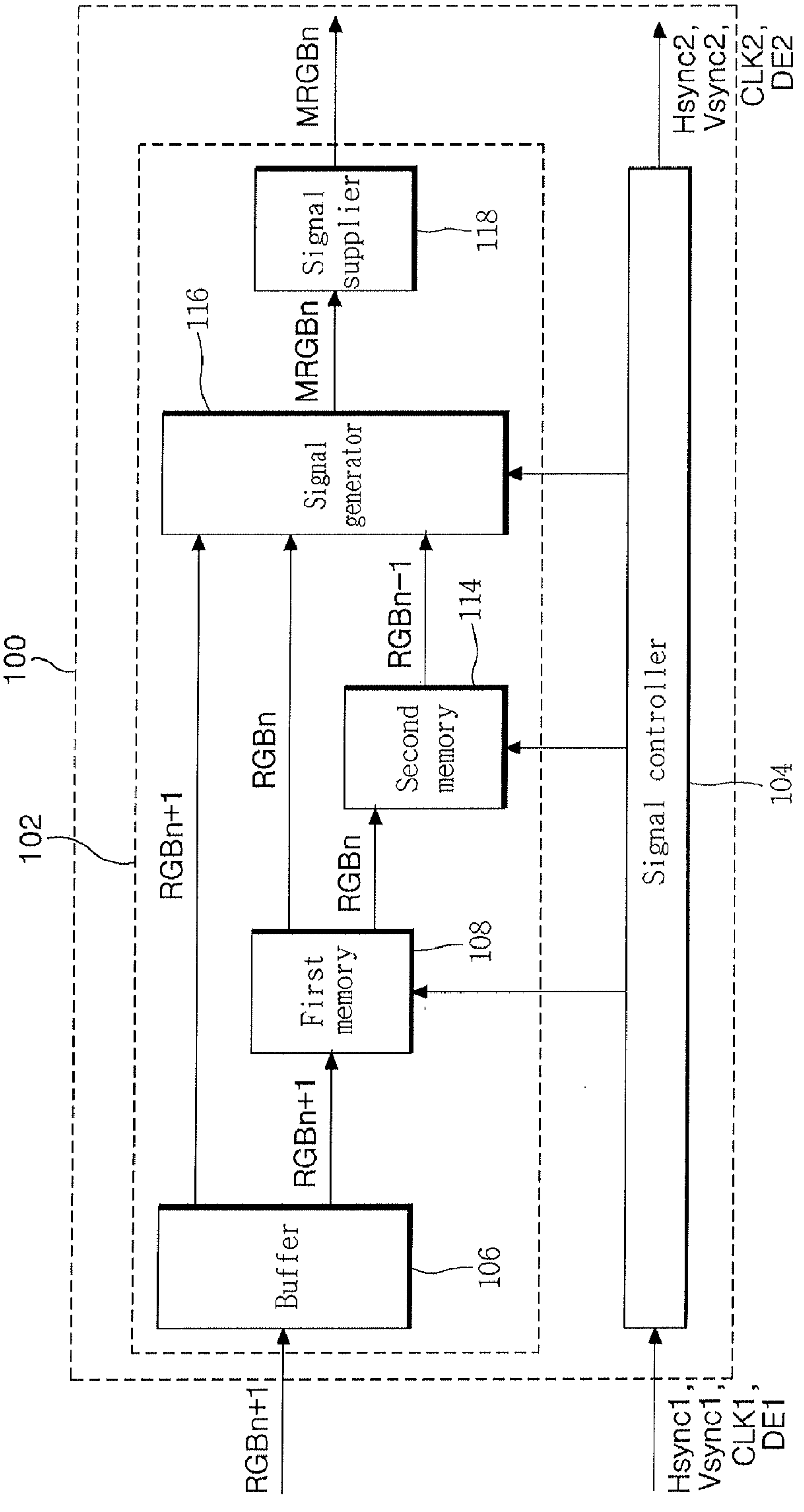
FIG. 9 is a block diagram specifically representing a configuration of a timing controller shown in FIG. 8.

The timing controller 100, as shown in FIG. 9, includes a data modulator 102 that modulates the input data RGB. A signal controller 104 controls the inputted signals.

The signal controller 104 generates second vertical/horizontal synchronization signals Vsync2, Hsync2, a second clock signal CLK2 and a second data enable signal DE2 by use of first vertical/horizontal synchronization signals Vsync1, Hsync1, a first clock signal CLK1 and a first data enable signal DE1 which are inputted from a system. The second vertical/horizontal synchronization signals Vsync2, Hsync2, the second clock signal CLK2 and the second data enable signal DE2 are modulation signals that drive the data driver 110 and the scan driver 120 at a double frequency in comparison with the related art. The signal controller 104 acts to delay for a fixed time so that the second vertical/horizontal synchronization signals Vsync2, Hsync2, the second clock signal CLK2 and the second data enable signal DE2 are synchronized with the data MRGB modulated by the data modulator 102.

The data modulator 102 includes a buffer 106, first and second frame memories 108, 114, a signal generator 116, and a signal supplier 118 that modulates the inputted video data RGB. An $(n-1)^{th}$video data (RGBn−1) being data of an $(n-1)^{th}$(RGBn) and an $(n+1)^{th}$ video data (RGBn+1) being data of an $(n+1)^{th}$ frame are supplied through the buffer 106 in order to modulate an $n^{th}$ video data (RGBn) that is video data of an $n^{th}$frame. The $n^{th}$ video data (RGBn) is stored at the first frame memory 108 and the $(n-1)^{th}$ video data (RGBn−1) is stored at the second frame memory 114. If the (n+1)th video data (RGBn+1) is supplied to the signal generator 116 and to the first frame memory 108, the nth video data (RGBn) stored at the first frame memory 108 is supplied to the signal generator 116 and the second frame memory 114, and the (n−1) th video data (RGBn−1) stored at the second frame memory 114 is supplied to the signal generator 116. The signal generator 116 compares the $n^{th}$ video data (RGBn) with the video data of the frames before and after the $n^{th}$ frame, i.e., the $(n-1)^{th}$ video data (RGBn−1) and the $(n+1)^{th}$ video data (RGBn+1), and selects the modulated data MRGBn to output corresponding to the comparison result at a lookup table. The signal supplier 118 supplies the modulated data MRGBn that are outputted from the signal generator 116 to the data driver 110.

For example, the display device drives the data driver 110 and the scan driver 120 at a double frequency in comparison with the related art, thereby reducing the holding time of the data and outputting the black or gray data selected in the lookup table of the data modulator 102 during the remaining period.

Figure 10:
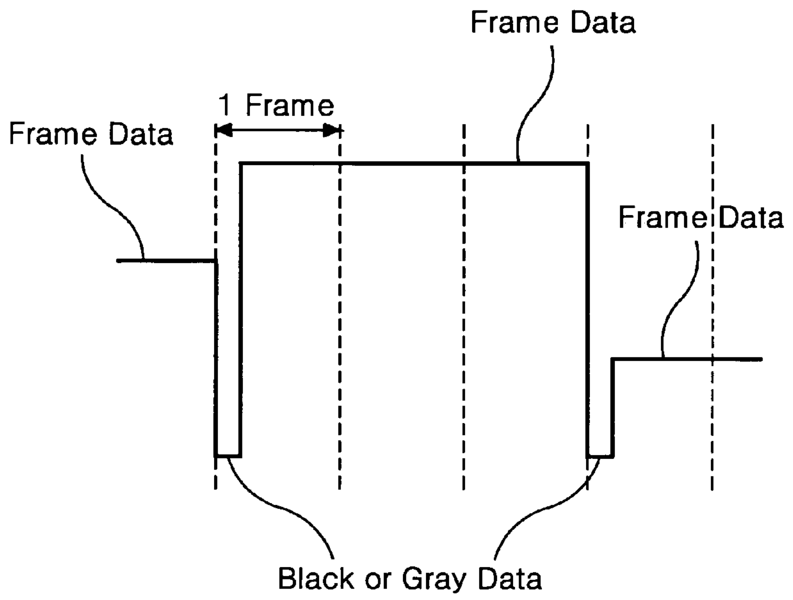
FIG. 10 is a diagram representing the data that are modulated by inserting black or gray data.

As shown in FIG. 10, the modulated data MRGB becomes the data inclusive of the black or gray data for a fixed time of a preceding or following part of the video data (frame data) that is desired to be expressed in one frame. The gray level value of the gray data is set to be higher than the black data and lower than the gray level value of the video data. The gray data can be a plurality of gray level values that are divided into several levels so that different brightness can be shown. Accordingly, when the video data of the present frame is the same as the video data of the previous frame, no black or gray data is inserted to the data outputted from the lookup table of the signal generator 116, thus it is possible to minimize brightness deterioration. The video data of the present frame of the display device are compared with the video data of the preceding and following frames and the gray or black data are inserted in accordance with the comparison result, thereby minimizing the brightness deterioration.

The timing controller 100 generates a data control signal DDC that controls the data driver 110 and a scan control signal SDC. The scan control signal controls the scan driver 120 by use of the modulated vertical/horizontal synchronization signals Vsync2, Hsync2, the clock signal CLK2 and the data enable signal DE2.

The data driver 110 includes a shift register; a register temporarily to store the modulated data MRGB from the timing controller 100 ; a latch to store the modulated data line and to output the stored data of one line portion at the same time in response to the clock signal from the shift register; a digital/analog converter to select an analog positive/negative gamma compensation voltage corresponding to a data value from the latch; a multiplexer to select the data line 112 to which the positive/negative gamma compensation voltage is supplied; and an output buffer connected between the multiplexer and the data line 112. The data driver 110 receives the modulated video data MRGB and supplies the modulated data MRGB to the data lines 112 of the display panel 130 under control of the timing controller 100.

Figure 11:
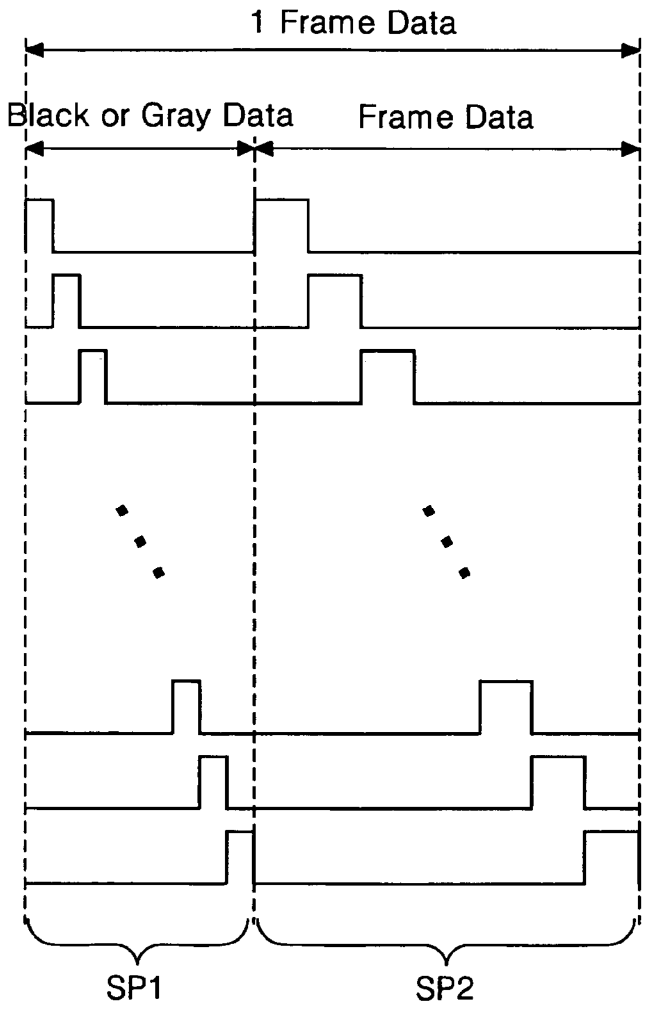
FIG. 11 is a diagram for explaining double speed driving of a data driver and a scan driver.

The scan driver 120 sequentially generates a scan pulse in response to a scan control signal SDC from the timing controller 100. The scan driver 120, as shown in FIG. 11, drives at a double speed during one frame to generate a first scan pulse SP1 that enables the black or gray data from the data driver 110 to be expressed and a second scan pulse SP2 that enables the frame data from the data driver 110 to be expressed. The frame data, for example, may be the video data desired to be expressed. The data driver 110 drives at the double speed for one frame period so that the black and or gray data, and the frame data are to be outputted .

Figure 12:
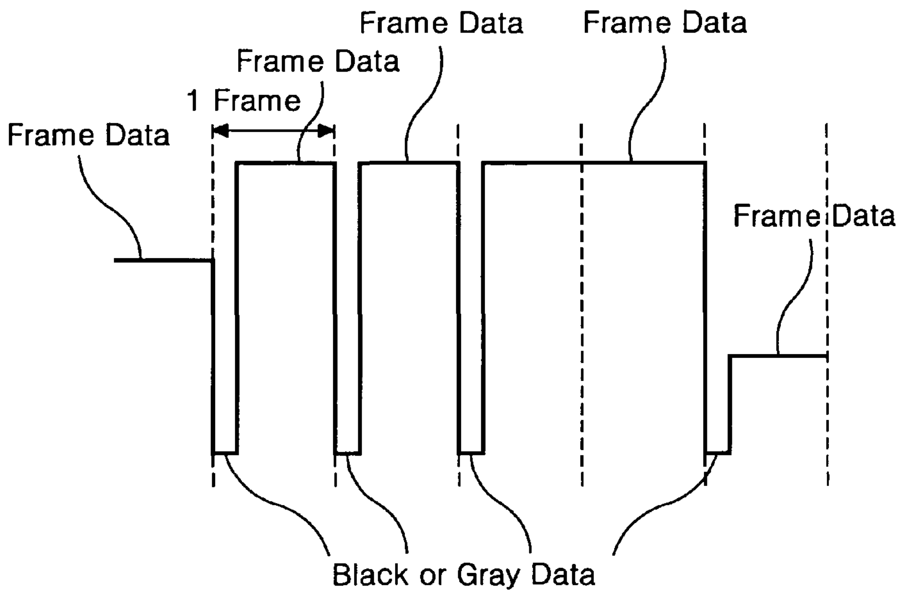

The video data of the present frame are compared with the video data of the frames before and after the present frame by use of two frame memories in the data modulator 102, as shown in FIG. 9. However, it is possible to compare the video data of the present frame with the video data of the previous frame or to compare the video data of the present frame with the video data of the next frame by use of one frame memory. When intending to compare the video data of m (m is a natural number of not less than 2) number of frames, it is possible to use (m−1) number of frame memories. When the same video data last for f (f is a natural number of $2 \leqq f \leqq m$) number of frames among m number of frames, the black or gray data can be inserted for a period from the first frame to a $k^{th}$ (k is a natural number of $k \leqq f$) frame among the f number of frames and the black or gray data can be inserted gradually so that it is made close to the video data (frame data) intended to be expressed in the frame. FIG. 12 shows a diagram representing black or gray data inserted for three frames when the same video data last for four frames. FIG. 13 is a diagram representing black or gray data inserted gradually so that it is close to the frame data in the same case of FIG. 12. In FIG. 13, the black or gray data are inserted in an ‘A’ frame, and the gray data that get close to the gray level of the frame data are inserted in ‘B’, ‘C’ frames.

The display device can apply an over driving circuit ODC for optimizing a response speed. For example, when the black or gray data are inserted in the frame, as shown FIG. 14, the data value D2 of a specific frame is modulated to have a higher gray level value than the original input data D1, thereby improving the response speed. When supplying the frame data in the liquid crystal display device by use of the lookup table, the over driving method supplies the data of a gray level higher than the desired data, thereby it is possible to increase the response speed of the liquid crystal. In the organic light emitting diode, the frame data are pre-supplied before the corresponding frame starts in the pre-charge, thus it is possible to increase a data realization speed.

The display device and the driving method thereof compares the input data for each frame in the hold type display device, and modulates the input data by inserting the black or gray data in accordance with the comparison result. Accordingly, it is possible to minimize the brightness deterioration and the motion blurring problem.

Although exemplary embodiments have been shown in the drawings and described above, it should be understood to the ordinary skilled person in the art that the invention is not limited to the embodiments, but rather that various changes or modifications thereof are possible.

What is claimed is:

1. A display device, comprising:

a data modulator that is configured to:

compare input data of a (m)th frame with input data of a (m−1)th frame and input data of a (m+1)th frame, m being a natural number not less than two, determine whether to insert one of black data, gray data, or a combination of the black data and the gray data into the (m)th frame at a period of the (m)th frame that precedes or follows a period of the (m)th frame that comprises the input data, the determination being based on the comparison of the input data of the (m)th frame, the input data of the (m−1)th frame, and the input data of the (m+1)th frame, and generate modulated input data of the (m)th frame based on the determination, the modulated input data of the (m)th frame comprising one of:

the input data of the (m)th frame, and the input data of the (m)th frame and the black data, the gray data, or the combination of the black data and the gray data that is inserted into the (m)th frame; and a driver that supplies the modulated input data of the (m)th frame to a display panel, wherein the data modulator includes a buffer, first and second frame memories, a signal generator and a signal supplier that modulates the input data, wherein the input data of the (m)th frame is stored at the first frame memory and the input data of the (m−1)th frame is stored at the second frame memory, wherein the input data of the (m−)th frame, the input data of the (m)th frame and the input data of the (m+1)th frame are supplied to the buffer for modulating the input data of the (m)th frame, wherein the black data, the gray data, or the combination of the black data and the gray data is inserted into the (m)th frame based on a lookup table that corresponds to the comparison of the input data of the (m−1)th frame, the (m)th frame, and the (m+1)th frame, wherein the input data of the (m)th frame stored at the first frame memory is supplied to the signal generator and the second frame memory, and the input data of (m−1)th frame stored at the second frame memory is supplied to the signal generator, if the input data of the (m+1)th frame is supplied to the signal generator and the first frame memory, wherein the data modulator determines not to insert the black data, the gray data, or the combination of the black data and the gray data when the input data of the (m)th frame and the input data of the (m−1)th frame and the input data of the (m+1)th frame comprise the same data, wherein a gray level value of the gray data is higher than a gray level value of the black data and lower than a gray level value of the input data, and the gray data includes a plurality of gray level values which are divided into several levels so that different brightness be shown.

2. The display device according to claim 1, wherein the data modulator inserts the black data, the gray data or the combination thereof sequentially to the input data from the first frame to the kth (where k is a natural number of k≦f) frame among f (where f is a natural number of 2≦f≦m) number of frames having the same input data, among the m number of frames.

3. The display device according to claim 2, wherein the data modulator modulates the input data to have a higher gray level value than the input data.

4. The display device according to claim 2, wherein the data modulator modulates the input data so that the input data are supplied before the corresponding frame starts.

5. The display device according to claim 2, wherein the data modulator modulates the input data by inserting black data, gray data or the combination thereof in the first frame among the k number of frames and inserting the gray data, wherein the gray level gets close to the same input data in the input data of the frame thereafter.

6. The display device according to claim 3, wherein the data modulator modulates the input data so that the input data are supplied in before the corresponding frame starts.

7. The display device according to claim 1, wherein the driver includes: a data driver that supplies the data modulated by the data modulator to data lines of the display panel; a scan driver that sequentially supplies a scan pulse synchronized with the modulated data to scan lines that cross the data lines; and a timing controller that controls the data driver and the scan driver, wherein the data driver and the scan driver is driven at double frequency to reduce a data holding time of the one frame and output the black data or the gray data selected in the lookup table for the remaining period of the one frame, wherein the data modulator is embedded in the timing controller.

8. A driving method of a display device, comprising:

supplying input data of a (m−1)th frame, input data of a (m)th frame and input data of a (m+1)th frame to a buffer to modulate the input data of (m)th frame, m being a natural number not less than two, storing the input data of the (m)th frame at a first frame memory and storing the input data of the (m−1)th frame at a second frame memory;

comparing the input data of the (m)th frame with the input date of the (m−1)th frame and the input data of the (m+1)th frame, determining whether to insert black data, gray data or a combination of the black data and the gray data into the (m)th frame at a period of the (m)th frame that precedes or follows a period of the (m)th frame that comprises the input data, the determination being based on the comparison of the input data of the (m)th frame, the input data of the (m−1)th frame, and the input data of the (m+1)th frame, generating modulated input data of the (m)th frame based on the determination, the modulated input data of the (m)th frame comprising one of:

the input data of the (m)th frame, and the input data of the (m)th frame and the black data, the gray data, or the combination of the black data and the gray data that is inserted into the (m)th frame, supplying the modulated input data to a display panel, wherein the determination whether to insert the black data, the gray data, or the combination of the black data and the gray data comprises determining not to insert the black data, the gray data, or the combination of the black data and the gray data when the input data of (m)th frame, the input data of the (m−1)th frame, and the input of the (m+1)th frame comprise the same data, wherein a gray level value of the gray data is higher than a gray level value of the black data and lower than a gray level value of the input data, and the gray data includes a plurality of gray level values which are divided into several levels so that different brightness be shown.

9. The driving method according to claim 8, wherein modulating the input data inserts black data, gray data or the combination thereof sequentially to the input data from the first frame to the kth (where k is a natural number of k≦f) frame among f (where f is a natural number of 2≦f≦m) number of frames having the same input data, among the m number of frames.

10. The driving method according to claim 9, wherein modulating the input data modulates the input data to have a higher gray level value than the input data.

11. The driving method according to claim 9, wherein modulating the input data modulates the input data so that the input data are supplied before the corresponding frame starts.

12. The driving method according to claim 9, wherein modulating the input data modulates the input data by inserting black data, gray data or the combination thereof in the first frame among the k number of frames and inserting the gray data, wherein the gray level gets close to the same input data in the input data of the frame thereafter.

13. The driving method according to claim 12, wherein modulating the input data modulates the input data so that the input data are supplied in pre-charge before the corresponding frame starts.

14. The driving method according to claim 8, wherein supplying the modulated input data to the display panel includes:

supplying the data modulated by the data modulator to data lines of the display panel;

sequentially supplying a scan pulse synchronized with the modulated data to scan lines that cross the data lines; and controlling the data driver and the scan driver, wherein the data driver and the scan driver is driven at double frequency to reduce a data holding time of the one frame and output the black data or the gray data selected in the lookup table for the remaining period of the one frame.

15. A display device, comprising:

a data modulator that is configured to:

compare video data of a (m)th frame with video data of a (m−1)th frame and video data of a (m+1)th frame, m being a natural number not less than two, determine whether to insert one of black data, gray data, or a combination of the black data and the gray data into the (m)th frame at a period of the (m)th frame that precedes or follows a period of the (m)th frame that comprises the video data, the determination being based on the comparison of the video data of the (m)th frame, the video data of the (m−1)th frame, and the video data of the (m+1)th frame, and generate modulated video data of the (m)th frame based on the determination, the modulated video data of the (m)th frame comprising one of:

the video data of the (m)th frame, and the video data of the (m)th frame and the black data, the gray data, or the combination of the black data and the gray data that is inserted into the (m)th frame; and a driver that supplies the modulated video data to a display panel, wherein the data modulator includes a buffer, first and second frame memories, a signal generator and a signal supplier that modulates the video data, wherein the video data of the (m)th frame is stored at the first frame memory and the video data of (m−1)th frame is stored at the second frame memory, wherein the video data of the (m−1)th frame, the video data of the (m)th frame and the video data of the (m+1)th frame are supplied to the buffer for modulating the video data of the (m)th frame, wherein the black data, the gray data, or the combination of the black data and the gray data is inserted into the (m)th frame based on a lookup table that corresponds to the comparison of the video data of the (m−1)th frame, the video data of the (m)th frame, and the video data of the (m+1)th frame, wherein the video data of the (m)th frame stored at the first frame memory is supplied to the signal generator and the second frame memory, and the video data of the (m−1)th frame stored at the second frame memory is supplied to the signal generator, if the video data of the (m+1)th frame is supplied to the signal generator and the first frame memory, wherein the data modulator determines not to insert the black data, the gray data, or the combination of the black data and the gray data when the video data of the (m)th frame, the video data of the (m−1)th frame, and the video data of the (m+1)th frame comprise the same data, wherein a gray level value of the gray data is higher than a gray level value of the black data and lower than a gray level value of the video data and, the gray data includes a plurality of gray level values which are divided into several levels so that different brightness be shown.

16. The display device according to claim 15, wherein black data, gray data or the combination thereof are not inserted in the last frame among the plurality of frames.

* * * * *